United States Patent [19]

Harney et al.

[11] 4,068,953

[45] Jan. 17, 1978

[54] RAMAN SCATTERING METHOD AND APPARATUS FOR MEASURING ISOTOPE RATIOS AND ISOTOPIC ABUNDANCES

[76] Inventors: Robert C. Harney, 5665 Charlotte Way, No. 80, Livermore, Calif. 94550; Stewart D. Bloom, 141 Via Serena, Alamo, Calif. 94507

[21] Appl. No.: 567,373

[22] Filed: Apr. 11, 1975

[51] Int. Cl.² ............................................ G01J 3/44
[52] U.S. Cl. ................................................. 356/75
[58] Field of Search ........................................ 356/75

[56] References Cited
PUBLICATIONS

Hirschfeld et al., "Proceeding of the Technical Program of the Electro-Optical Systems Design Conference", Sept. 16-18; 1969, pp. 418-427.

Melfi, Applied Optics, vol. 11, No. 7, July 1972, pp. 1605-1609.

Primary Examiner—John K. Corbin
Assistant Examiner—F. L. Evans
Attorney, Agent, or Firm—Phillips, Moore, Weissenberger, Lempio & Majestic

[57] ABSTRACT

Raman scattering is used to measure isotope ratios and/or isotopic abundances. A beam of quasi-monochromatic photons is directed onto the sample to be analyzed, and the resulting Raman-scattered photons are detected and counted for each isotopic species of interest. These photon counts are treated mathematically to yield the desired isotope ratios or isotopic abundances.

25 Claims, 11 Drawing Figures

RAMAN SCATTERING METHOD AND APPARATUS FOR MEASURING ISOTOPE RATIOS AND ISOTOPIC ABUNDANCES

BACKGROUND OF THE INVENTION

This invention relates to the measurement of isotope ratios and/or isotopic abundances using Raman scattering.

Isotope ratio measurements have become increasingly important in chemistry, biology, and medicine in recent years. This is primarily due to the increased availablity of enriched isotopes and labeled compounds. Furthermore, the availiability of these isotopes is expected to increase even more as refinements are made in the techniques of laser isotope separation. As a result, isotope ratio measurements will become even more common in the near future.

When dealing with radioactive isotopes little difficulty is encountered in making the isotope ratio measurements. However, when dealing with stable isotopes (which are preferable to radioactive isotopes in many studies for safety reasons) th situation is different. At present, mass spectrometry is the only accurate method for making stable isotope ratio measurements. This technique is slow, requiring minutes for even a crude measurement, and it consumes the sample. The extremely long time required for each measurement severely limits the number of samples which can be analyzed in a reasonable length of time. As a consequence many important studies using stable isotopes as tracers are not feasible at this time.

Therefore, it it highly desireable to have a technique for measuring stable isotope ratios which is at least an order of magnitude faster than mass spectrometry and which, if possible, does not consume the sample.

SUMMARY OF THE INVENTION

According to our invention, isotope ratios and/or isotopic abundances (of both stable and radioactive isotopes) are measured by determining the number of photons which are inelastically scattered out of a photon beam by each isotope (or isotopic molecule) via the Raman effect. Photons from different isotopes (or isotopic molecules) are discriminated by the fact that they are of different frequencies (due to the Raman isotope effect). Measurement is accomplished in the following manner. The sample to be analyzed is placed in an intense photon beam (this could be either an intracavity or extracavity laser beam or a beam generated by other means, such as neutron capture gamma radiation). The scattered light is collected and simultaneously analyzed by a number of monochromators (or other frequency-selecting devices) each tuned to a different isotopic frequency. The photons passed by each monochromator are then detected by fast photon counting electronics. As the number of photons scattered at each isotopic frequency is proportional to the number density of that species, the isotope ratios and/or isotopic abundances can be inferred directly from the numbers of photons scattered at each frequency. It is characteristic of this technique that the precision of any measurement is determined solely by the total number of photons scattered by ech isotopic species. consequently, any desired precision can be obtained by counting for a sufficient length of time. It is also a consequence that by increasing the intensity of the photon beam, the length of time required to achieve a desired precision is proportionately reduced. With present technology it is possible to build an instrument based on the foregoing principles which is faster and more accurate than a mass spectrometer in making isotope ratio or isotopic abundance measurements.

BRIEF DESCRIPTION OF THE DRAWING

Other features and advantages of our invention will become apparent from the following detailed description taken together with the drawing, in which.

DESCRIPTION OF SPECIFIC EMBODIMENTS

The basic principle behind our invention lies in the unobvious connection of two pieces of knowledge heretofore unrelated by the prior art. First, the energy levels of different isotopes of the same element are slightly different as are the energy levels of isotopically-substituted molecules of the same compound. Second, each Raman scattering process is characterized by a unique cross section. Thus, the number of photons scattered per second from a photon beam by a collection of atoms or molecules is directly proportional to the number density of the scattering species and to the number of photons per second incident on the scattering volume. While these facts have been known for many years to those skilled in the art, we are the first to connect them in an unambiguous yet unobvious way, that is, isotope ratios and/or isotopic abundances may be measured using Raman scattering. This is the crux of our invention.

Figure 1:
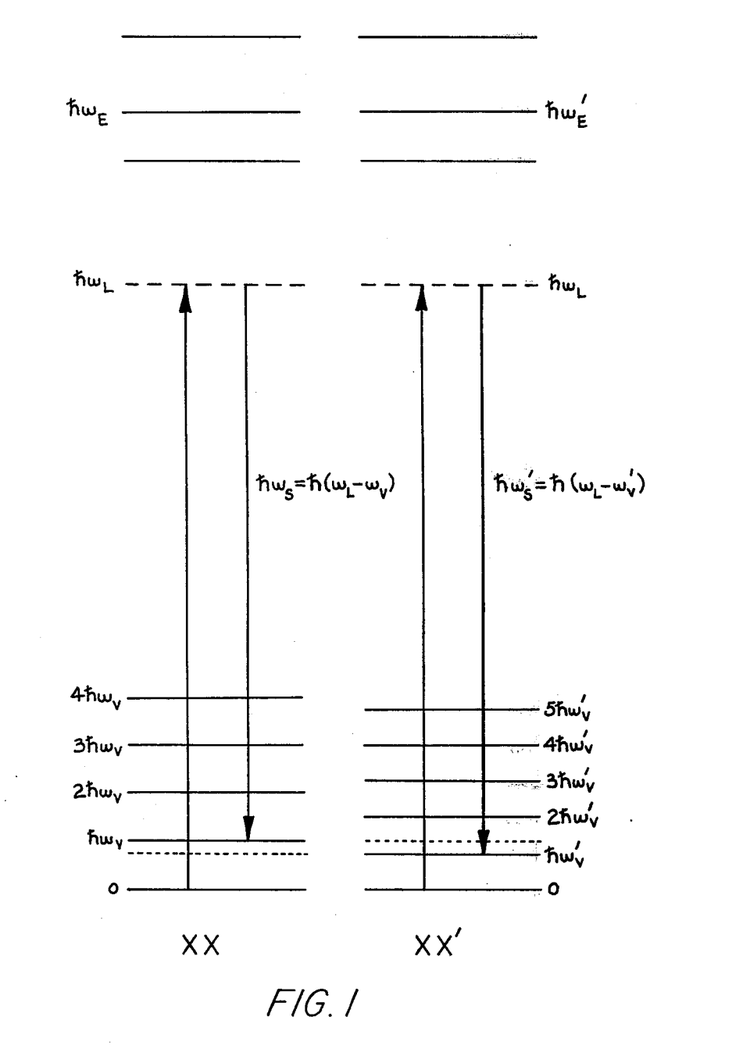
FIG. 1 is a schematic illustration of the energy levels of a diatomic molecule, illustrating how the isotope effect arises in vibrational Raman scattering.

When monochromatic photons Raman scatter from different isotopic species, the differences in the energy levels lead to a different set of scattered frequencies for each isotopic species. This phenomenon, known as the Raman isotope effect, is observed in all types of Raman scattering: nuclear, electronic, vibrational, and rotational scattering. FIG. 1 illustrates explicitly how the isotope effect arises in vibrational Raman scattering. Monochromatic photons of energy $\hbar\omega_L$ are incident upon the isotopic molecules XX (e.g. $^{14}N^{14}N$) and XX' (e.g. $^{14}N^{15}N$). A photon is absorbed exciting the molecule out of the ground state to a virtual state of energy $\hbar\omega_L$. This state then reradiates a photon decaying to the first excited vibrational state. The energy of this scattered photon is given by the difference between the incident photon energy and the energy of the first excited vibrational state. Since the energy of the first excited vibrational state of XX is not equal to the energy of the first excited vibrational state of XX', the energies of their respective scattered photons will not be equal. The process is quite similar in nuclear, electronic, and rotational scattering.

Much work was devoted in the early 1930's to studying the isotope effect in vibrational Raman scattering. Vibrations of a molecule which involve motion of an atom, which has two or more abundant stable isotopes, will manifest themselves as multiplets (one peak due to each isotopic species). The relative intensities of the lines of a suspected multiplet were measured using photographic film and correlated with known isotopic abundances. If a positive correlation was found, the multiplet was assumed to be the result of the isotope effect in a specific vibration. If no correlation was found, the multiplet was assumed to be the result of an accidental degeneracy between several different vibrations. In this work the isotope effect was used as a tool for elucidating the vibrations of a molecule, not for measuring the isotopic abundances of elements in the molecule. In no instance was the isotope effect used or proposed to measure isotopic abundances in an unknown sample. As this techniques required previous knowledge of the isotopic abundances, it is substantially different from our invention.

In the remainder of this specification we will use the term "quasi-monochromatic" to describe the photon beam. By this we mean that although the photon beam may contain a spread of frequencies, this spread is sufficiently small that the photons scattered from each isotopic species may be distinguished from those scattered from any other isotopic species solely on the basis of their frequencies. In nuclear Raman scattering the ratio $\Delta\omega/\omega$ of the maximum allowable spread in frequencies $\Delta\omega$ to the incident frequency $\omega$ is typically $10^{-4}$. In electronic Raman scattering $\Delta\omega/\omega$ is typically less than $10^{-6}$. In rotational and vibrational Raman scattering $\Delta\omega/\omega$ is typically $10^{-4}$. We also allow for the presence of a number of discrete frequencies in the photon beam as long as there is no overlap of the isotopic frequencies generated by scattering of photons of the incident frequency of interest with any of the isotopic frequencies generated by scattering of photons of any other incident frequency.

Because the photons scattered by different isotopic species have different frequencies they may be isolated by some kind of monochromator or energy-sensitive detector. Thus, the scattering from each individual species can be analyzed independently. As mentioned previously, the rate at which photons are scattered from the $i^{th}$ isotopic species, $I_{si}$, is related to the number density of that species, $\rho_i$, the rate at which protons are incident on the scattering volume, $I_o$, and the length of the scattering volume, L, through a cross section, $\sigma_i$. That is $$I_{si} = \rho_i \sigma_i L I_o. \qquad (1)$$

Since the $\sigma_i$ are unique constants and L and $I_o$ are the same for all isotopic species, it is evident that measurement of the $I_{si}$ is equivalent to measurement of the $\rho_i$ (from which the isotope ratios are determined). It is the isotope effect which permits the measurement of the $I_{si}$.

The spontaneous Raman scattering of photons is a random process and obeys Poisson statistics. As a result, the uncertainty in a measurement of the actual number of scattered photons is given by $N_i^{\frac{1}{2}}$, where $N_i$ is the measured number of scattered photons. Since $$N_i \propto \int I_{si} dt \propto \rho_i,$$

the accuracy of an isotope ratio measurement increases as $N_i$ increases. By integrating the scattered signals for a sufficient length of time any desired accuracy can be achieved. A similar result can be achieved by increasing the count rate.

The fractional abundance $f_j$ of an isotope $j$ of element X is given by a weighted sum of the number densities of species containing $j$ divided by a weighted sum of all species containing any isotope of element X. Specifically, $$f_j = \frac{\sum\limits_{k} n_{kj}\rho_k}{\sum\limits_{k} n_{kX}\rho_k}, \qquad \text{Equation (2)}$$

where $\rho_k$ is the number density of the $k^{th}$ species, $n_{kj}$ is the number of atoms of isotope $j$ in species $k$, and $n_{kX}$ is the total number of atoms of element X in species i k. In the special case where all species are atoms.

$$f_j = \rho_j / \Sigma_k \rho_k. \qquad (3)$$

The fractional isotopic abundances can be related to any specific isotopic abundances (e.g. grams of isotope $j$ per kilogram of sample) by simple multiplicative factors. The ratio $R_{ij}$ of the number density of an isotope $i$ to the number density of an isotope $j$ is given by $$R_{ij} = \frac{f_i}{f_j} = \frac{\sum\limits_{k} n_{ki}\rho_k}{\sum\limits_{k} n_{kj}\rho_k}. \qquad \text{Equation (4)}$$

The intensity $I_{mi}$ scattered from the $i^{th}$ isotopic species and measured by the $i^{th}$ detector is given by $$I_{mi} = \epsilon_i' I_{si} = \epsilon_i I_{opi} \qquad (5)$$

where $\epsilon_i'$ is the efficiency of the $i^{th}$ detector and $\epsilon_i$ is an "effective efficiency" ($\epsilon_i \equiv \epsilon_i' \sigma_i L$) of the $i^{th}$ detector. If photon counting detection is used, then the measured number $N_{mi}$ of photons scattered from the $i^{th}$ isotopic species and counted by the $i^{th}$ detector is given by $$N_{mi} = \epsilon_i \int_{\tau_{oi}}^{\tau_{fi}} I_{si} dt = \epsilon_i \rho_i \int_{\tau_{oi}}^{\tau_{fi}} I_o dt \qquad \text{Equation (6)}$$

where $\rho_i$ is assumed to be constant during the measurements and $\tau_{oi}$ is the time at which the measurement of the $i^{th}$ species began and $\tau_{fi}$ is the time at which measurement of the $i^{th}$ species ended. If a single detector is used to measure the photons scattered from several species (such as a multichannel analyzer or scanning monochromator) then the $\epsilon_i$ and $\epsilon_i'$ are to be interpreted as the efficiencies of that detector for detecting photons scattered only from the $i^{th}$ species.

If the incident intensity $I_o$ is known as a function of time, the $\epsilon_i$ may be measured by calibration of the system with a sample of known isotopic composition. Once the $\epsilon_i$ have been determined and $I_o(t)$ is known, measurement of $I_{mi}$ or $N_{mi}$ yields the $\rho_i$ upon application of Eq. (5) or Eq. (6). The $\rho_i$ may then be used to determine the isotope ratios through Eq. (4) or the fractional abundances through Eq. (2).

If simultaneous detection of the photons scattered from all isotopic species of interest is used, then $I_o(t)$, $\tau_{fi}$, and $\tau_{oi}$ are the same for all species $i$. Thus, substitution of Eq. (5) into Eqs. (2) and (4) yields $$f_j = \frac{\sum_k n_{kj} I_{mk} \epsilon_k^{-1}}{\sum_k n_{kx} I_{mk} \epsilon_k^{-1}} \qquad \text{Equation (7)}$$

and $$R_{ij} = \frac{\sum_k n_{ki} I_{mk} \epsilon_k^{-1}}{\sum_k n_{kj} I_{mk} \epsilon_k^{-1}}. \qquad \text{Equation (8)}$$

Substitution of Eq. (6) into Eqs. (2) and (4) yields $$f_j = \frac{\sum_k n_{kj} N_{mk} \epsilon_k^{-1}}{\sum_k n_{kx} N_{mk} \epsilon_k^{-1}} \qquad \text{Equation (9)}$$

and $$R_{ij} = \frac{\sum_k n_{ki} N_{mk} \epsilon_k^{-1}}{\sum_k n_{kj} N_{mk} \epsilon_k^{-1}}. \qquad \text{Equation (10)}$$

Eqs. (7)–(10) require no knowledge of $I_o(t)$, $\tau_{oi}$, or $\tau_{fi}$.

Figure 2:
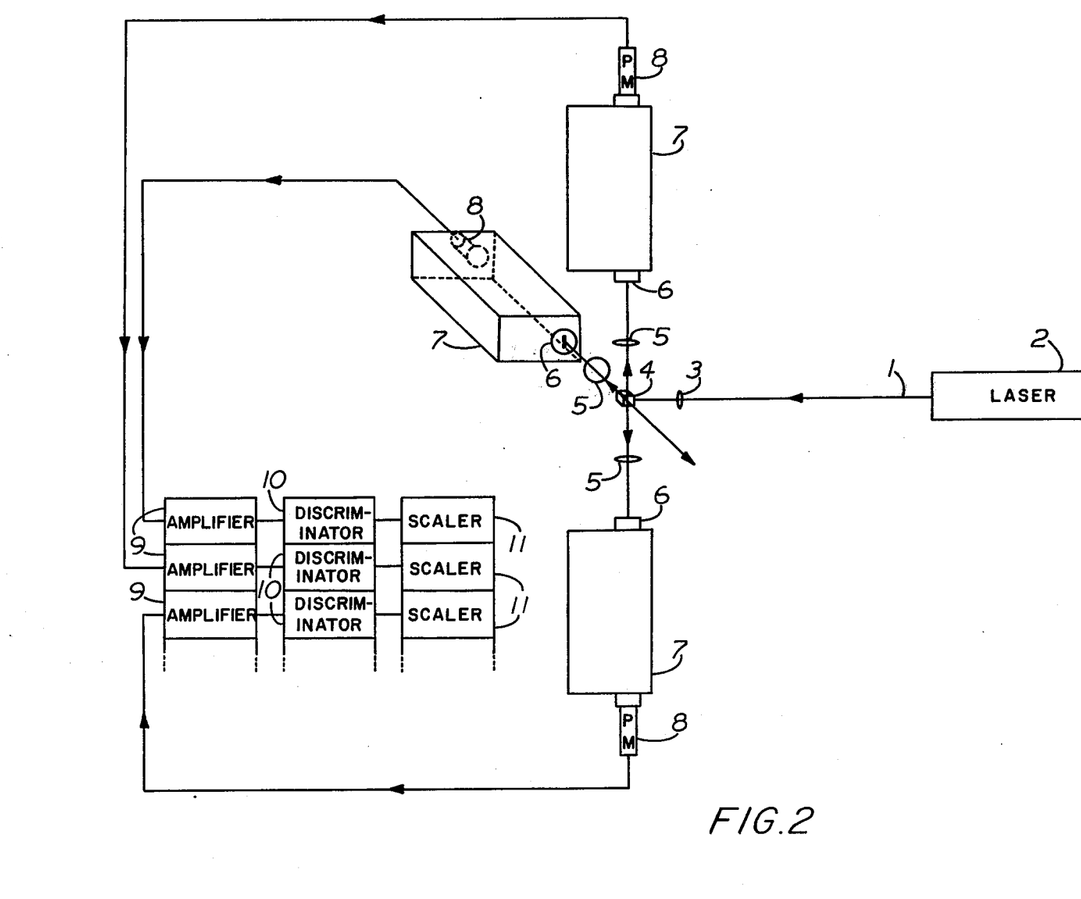
FIG. 2 is a schematic illustration of an embodiment of our invention utilizing either electronic, vibrational, or rotational scattering.

FIG. 2 is illustrative of one embodiment of our invention. A quasi-monochromatic photon beam 1 provided by a laser 2 is focused by a lens 3 into a cell 4 containing the sample to be analyzed. Photons are scattered by this sample into $4\pi$ steradians. Some of these photons are collected by a set of lenses 5 and focused onto the entrance slits 6 of a number of monochromators 7 each of which is tuned to a different isotopic frequency. The number of monochromators is sufficient to monitor all of the isotopic species necessary to make an accurate isotope ratio measurement. The photons passed by each monochromator are detected by a photomultiplier 8. Pulses from the photomultiplier are amplified 9, passed through a discriminator 10 to eliminate one source or noise, and recorded on a scaler 11. There is one photomultiplier-amplifier-discriminator-scaler system for each monochromator. Before using such a system for measuring isotope ratios it must be calibrated with samples of accurately known isotopic composition. This yields the relative efficiency of each monochromator system. On samples of unknown composition isotope ratio measurements are made by counting the scattered photons simultaneously with each monochromator system. Correcting the number obtained on the scalers by the relative efficiencies yields the relative number densities of each isotopic species. These numbers may then be used to calculate the desired isotope ratios.

Figure 3:
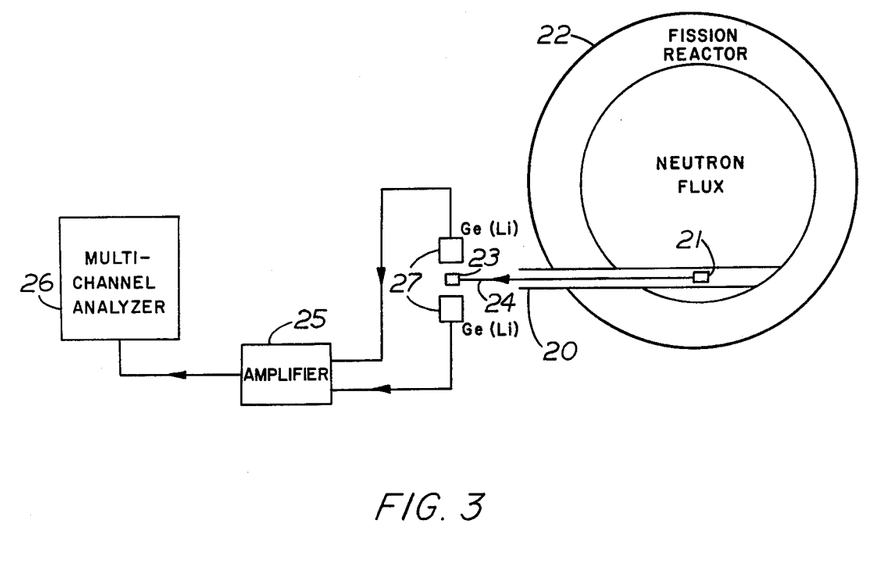
FIG. 3 is a schematic ilustration of an embodiment of our invention utilizing nuclear Raman scattering.
Figure 4:
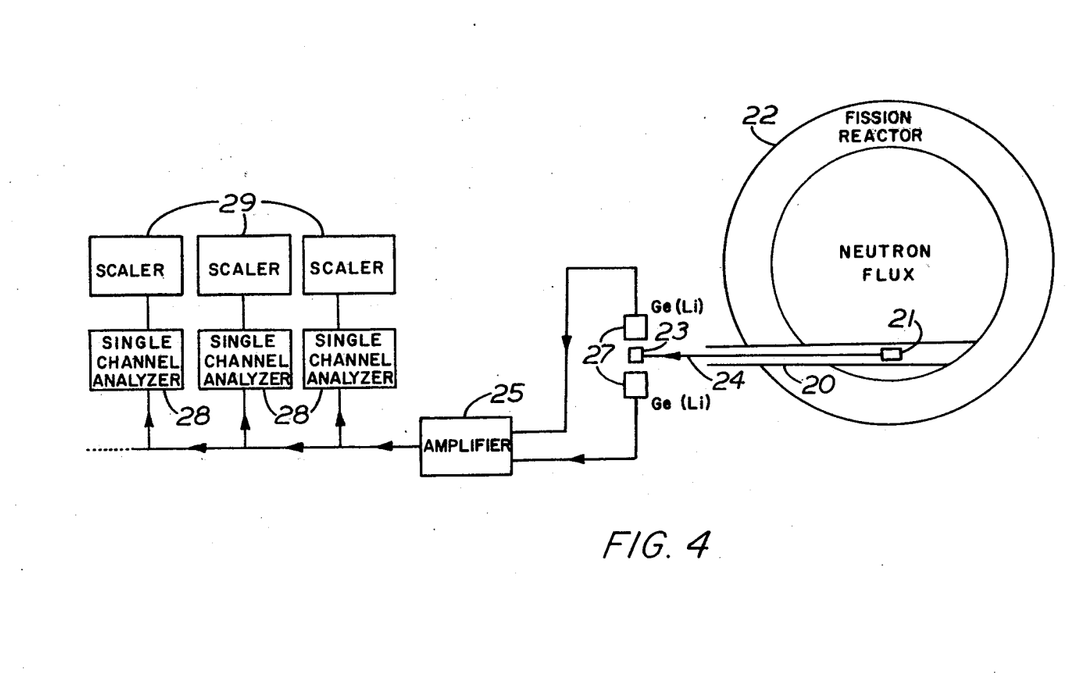
FIG. 4 is a schematic illustration of an alternate embodiment of our invention utilizing nuclear Raman scattering.

FIG. 3 illustrates an embodiment of our invention utilizing the nuclear Raman effect. A beam of quasi-monochromatic photons 24, generated by neutron capture plus gamma decay in an appropriate target 21 placed in an irradiation tube 20 inserted in a high-flux fission reactor 22, is scattered from the sample 23. The scattered photons are detected by Ge(Li) detectors 27 connected to an amplifier 25 and a multi-channel analyzer 26. Photons of different energies corresponding to different isotopes are recorded in different channels of the multi-channel analyzer. An alternate embodiment is shown in FIG. 4 where a sufficient number of single-channel analyzer 28 and scalers 29 replace the multi-channel analyzer. As with the example of FIG. 2, calibration with samples of known isotopic composition is required for accurate isotope ration determinations.

Figure 5A:
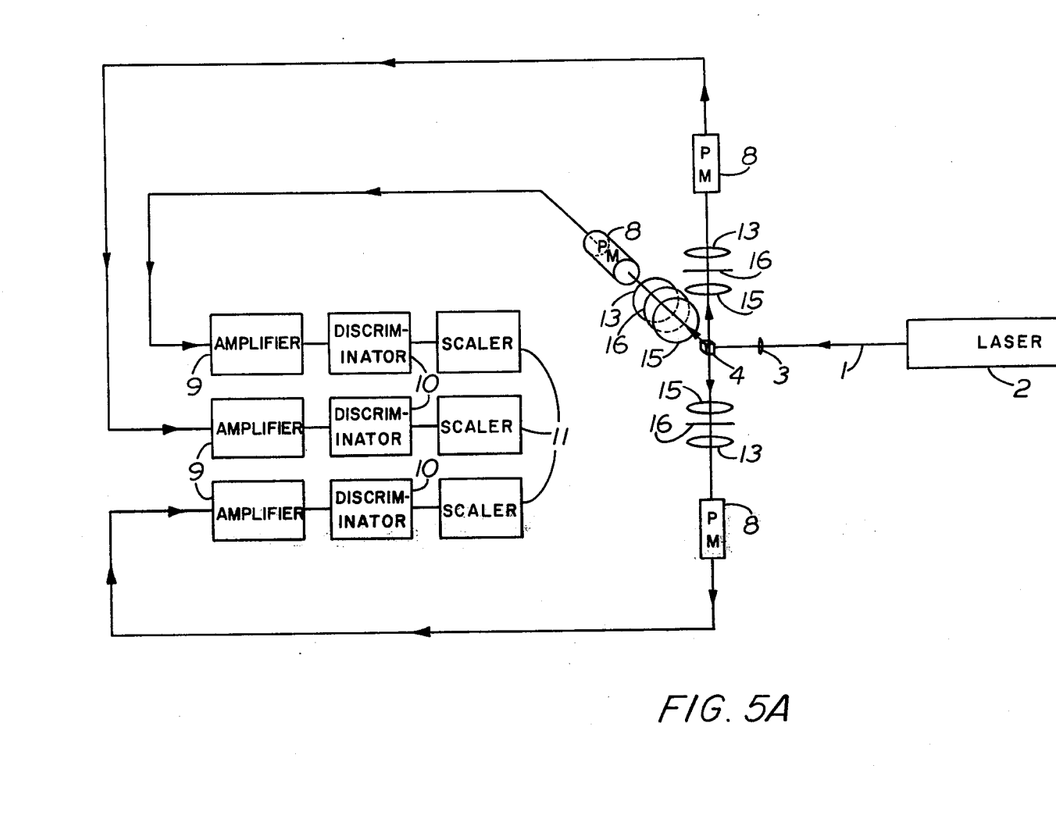
FIGS. 5A and 5B are schematic illustrations of our invention utilizing vibrational Raman scattering which are particularly applicable to determination of hydrogen-deuterium isotope ratios. The difference between FIG. 5A and 5B is that the former records data on three different isotopic species simultaneously, while the latter respectively records the data for each isotopic species in a sequential fashion.
Figure 5B:
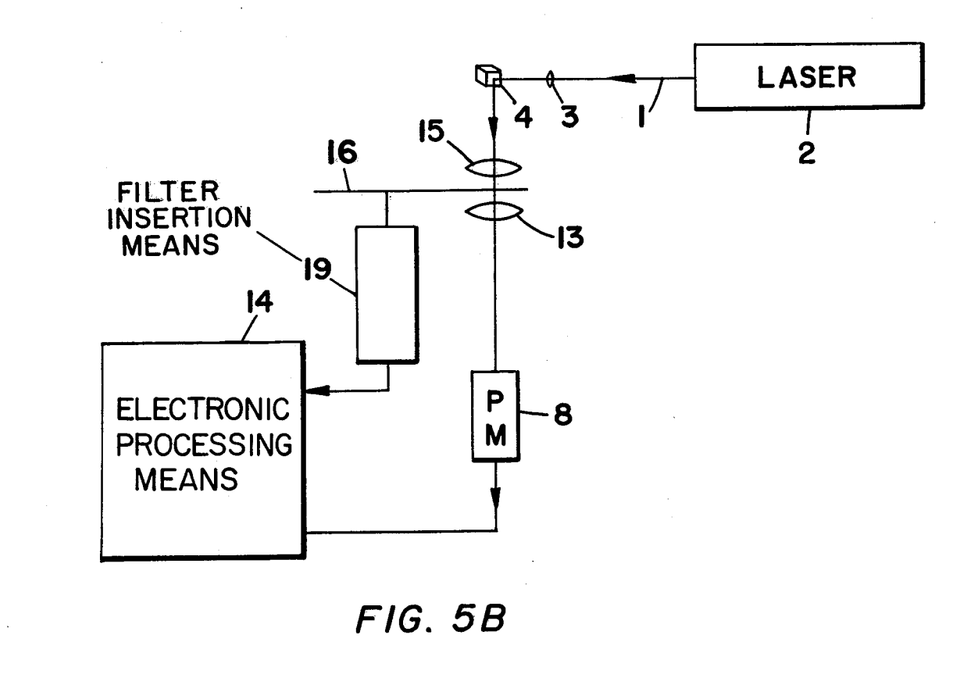

FIGS. 5A and 5B illustrate scehmatic embodiments of our invention which are applicable for hydrogen-deuterium isotope ratios. As in FIG. 2 the quasi-monochromatic photon beam 1 provided by a laser 2 is focused into a scattering cell 4 containing the sample to be analyzed. In FIG. 5A the scattered photons are collected by three lenses 15 passes through narrow-band interference filters 16, each designed to pass a different isotopic frequency, and focused by three more lenses 13 onto the photocathodes of photomultiplier tubes 8. The pulses from each photomultiplier are passed through an amplifier 9 and discriminator 10 and recorded on a scaler 11. Only three detector systems are needed as there are only three species of interest ($H_2$, HD, and $D_2$). The useful frequencies in this case correspond to the Q-branch vibrational frequencies of each of the isotopic molecules. Isotope ratio measurements are made in a manner identical to the previous examples.

In FIG. 5B two narrow-band interference filters 16 are alternately inserted into the scattered photon beam by filter insertion means 19. The filters pass between a single set of lenses 13 and 15, and the different frequencies corresponding to two different isotopic species are thereby focused sequentially onto a single photomultiplier tube 8. The pulses from photomultiplier tube 8 are then passed to electronic processing means 14 to obtain data representative of the desired isotope ratios and isotopes abundances.

Figure 6:
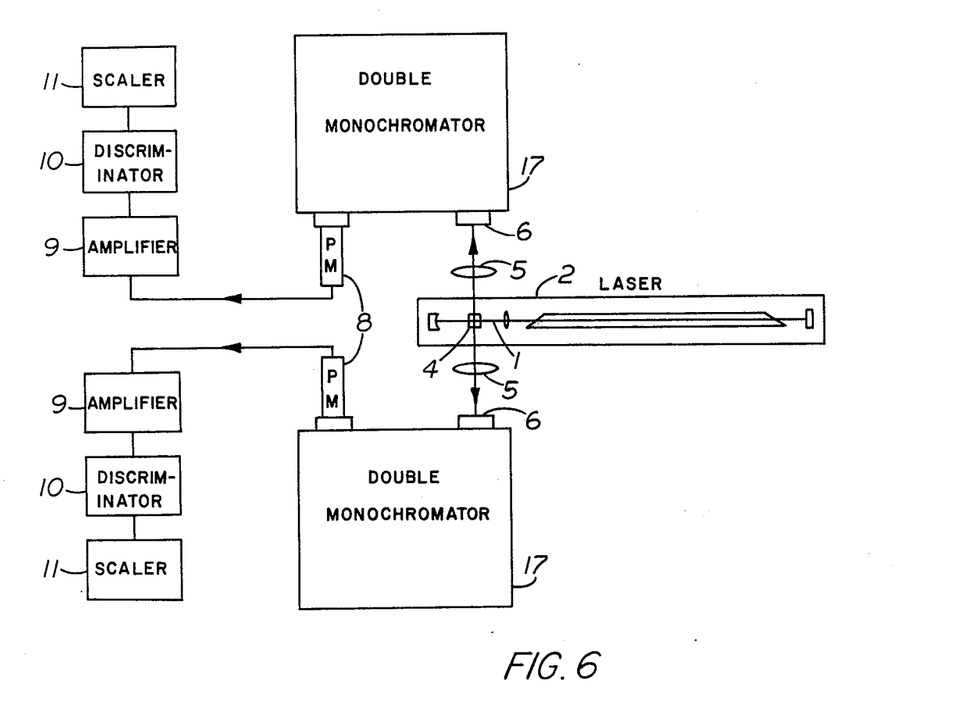
FIG. 6 is a schematic illustration of an embodiment of our invention utilizing vibrational or rotational scattering which is particularly applicable to diatomic molecules of elements with only two important isotopes.

FIG. 6 illustrates a specific embodiment of our invention which is particularly applicable to isotope ratio measurements of simple molecular systems at natural abundance. Examples of such simple systems include H/D in hydrogen gas, $^{12}C/^{13}C$ in carbon dioxide gas, $^{14}N/^{15}N$ in nitrogen gas, and $^{16}O/^{18}O$ in oxygen gas. A quasi-monochromatic beam of photons 1 is generated in the cavity of a laser 2. The scattering cell 4 containing the sample is placed in the photon beam inside the laser cavity. The scattered photons are collected by a pair of lenses 5 and focused onto the slits 6 of two double monochromators 17. Each monochromator is tuned to pass a different isotopic frequency. In the simple systems mentioned above, measurement at only two isotopic frequencies is sufficient to yield either an isotope ratio or the fractional abundances to an accuracy of a few tenths of a percent. The photons passed by each double monochromator are detected by a photomultiplier tube 8. The output pulses from these photomultipliers are passed through amplifiers 9 and discriminators 10 and recorded on scalers 11.

Figure 7:
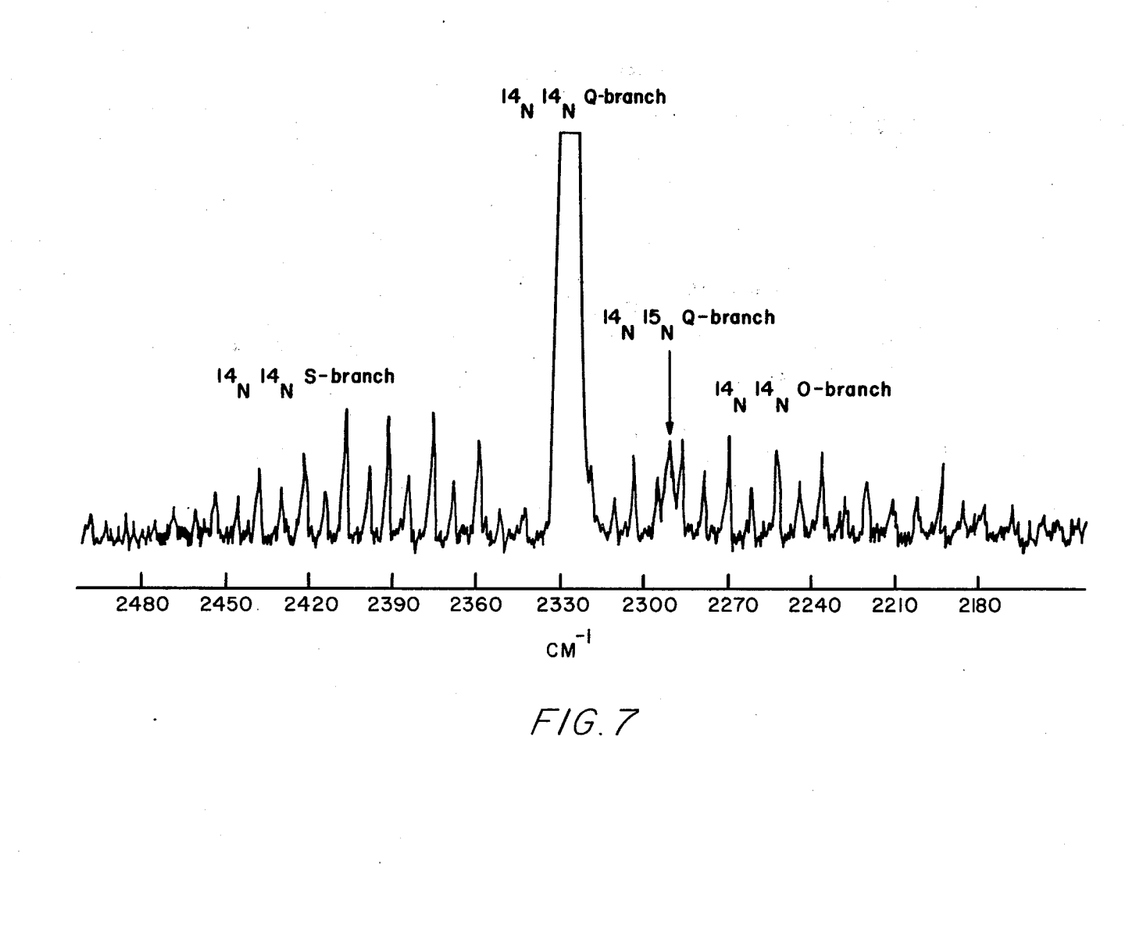
FIG. 7 is a reproduction of a photoelectrically-recorded vibrational Raman spectrum of nitrogen gas.

One problem which can occur in measuring isotope ratios at natural abundance is that the frequencies of weak Raman-scattered lines from other isotopic species may accidentally coincide with the frequency of the Raman-scattered lines of the isotopic species to be measured. In vibrational Raman scattering from diatomic molecules there are three sets of lines for each isotopic species. The Q-branch lines (corresponding to transitions in which the rotational quantum numbers of the initial and final states are the same) lie in a narrow band of frequencies while the O-branch lines (initial and final state rotational quantum numbers differ by − 2) and S-branch lines (initial and final state rotational quantum numbers differ by + 2) are spread over a wide range of frequencies. The Raman spectrum of nitrogen gas shown in FIG. 7 illustrates this point. Because the Q-branches have a higher density of scattered photons per unit frequency interval than do the O-or S-branches, it is desirable to use the Q-branches in making isotope measurements. However, at natural abundance the number of photons scattered by a single O-branch or S-branch line of an abundant isotopic species (e.g. $^{14}N^{14}N$) may be greater than the total number of photons scattered by the entire Q-branch of a low-abundance species (e.g. $^{14}N^{15}N$). If one of the lines from an abundant species is coincident with the Q-branch of a low-abundance species, it can interfere with the measurement. The measurement can still be made but the analysis of the data is much harder.

Figure 8:
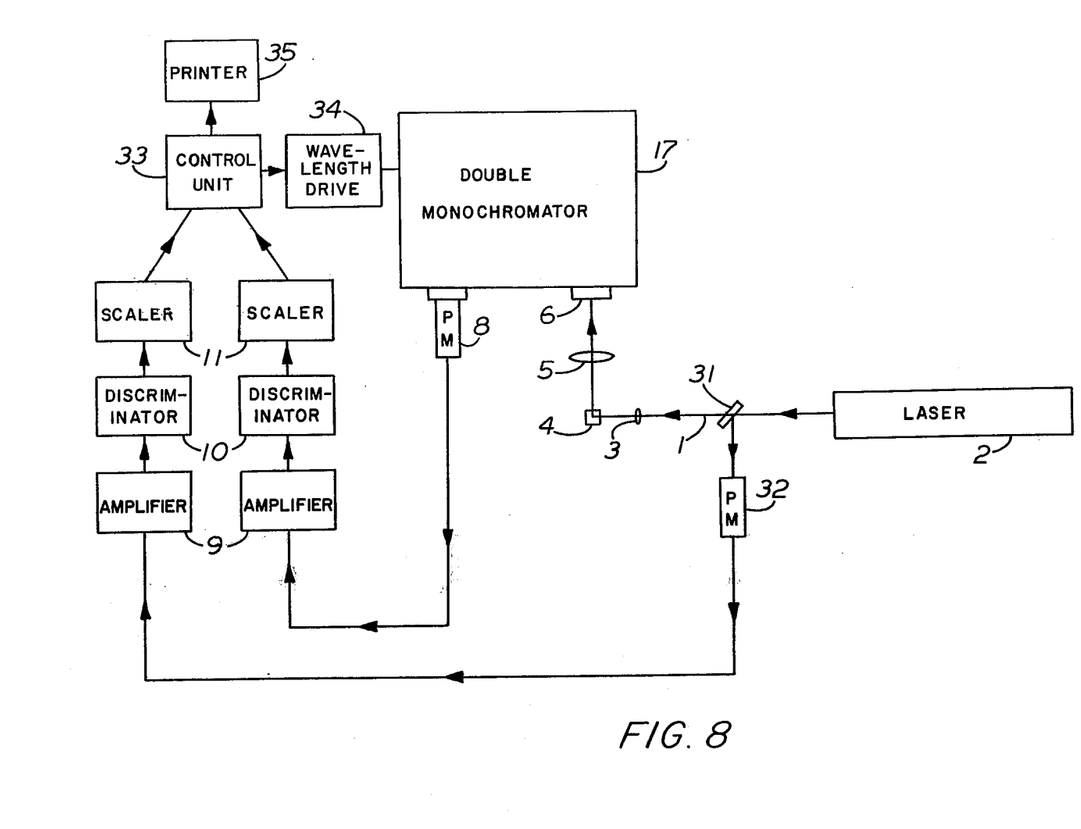
FIG. 8 is a schematic illustration of a photon-counting Raman spectrometer used in studies of isotopes of oxygen and nitrogen.

FIG. 8 is a schematic illustration of a photon-counting Raman spectrometer which was constructed for the purpose of determining the feasibility of applying our invention to isotope measurements in nitrogen, oxygen, and hydrogen. The photon beam 1 provided by a low-power (nominal 1.5 watt output) argon ion laser 2 operating at 4880 A, is focused by a lens 3 into a scattering cell 4. The Raman-scattering photons are collected by a lens 5 and focused onto the entrance slit 6 of a grating double monochromator 17. Holographic gratings with 2400 g/mm were employed in the monochromator to improve resolution and reduce stray scattered light to negligible levels. Photons passed through the double monochromator are detector by a high-sensitivity photomultiplier tube 8 cooled to 31 70° C to reduce dark noise to less than 3 counts/sec. Pulses from the photomultiplier are passed through an amplifier 9 and discriminator 10 and counted on a scaler 11. To provide a continuous monitor on the laser power, a portion of the photon beam is diverted by a beamsplitter 31 onto the photocathode of photomultiplier tube 32. Pulses from this photomultiplier are processed by a second amplifier 9, discriminator 10, and scaler 11. An automated control unit 33 controls both scaler units, the wavelength drive 34 of the monochromator, and a line printer 35. This control unit functions as follows. The signal and monitor scalers are allowed to accumulate photon counts for a preset amount of time. The control unit then prints this data on the line printer and resets the scalers to zero. Next the controller changes the wavelength setting on the monochromator by a fixed increment and repeats the cycle. This unit allows a Raman spectrum to be taken point-by-point without operator intervention.

Figure 9:
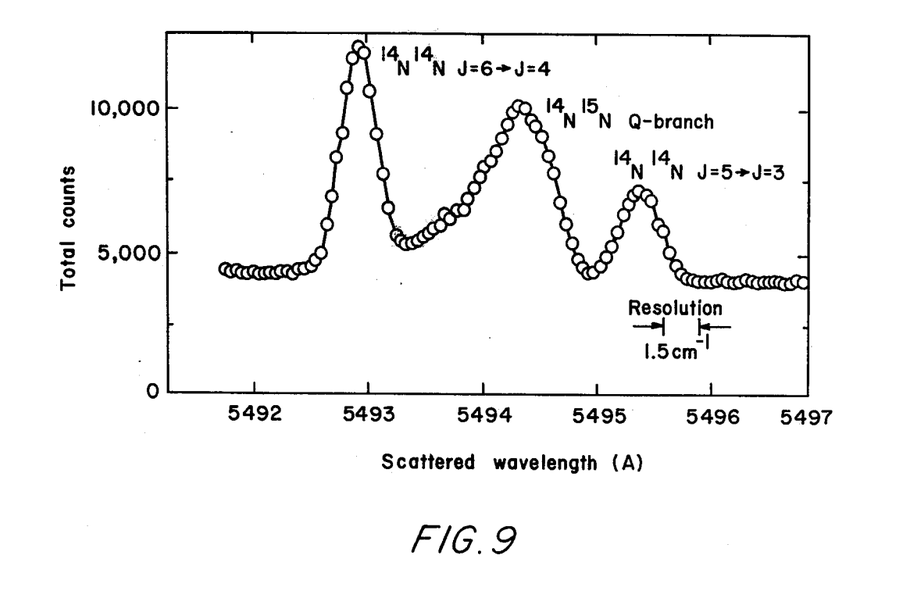
FIG. 9 is a high-resolution Raman spectrum of nitrogen gas in the wavelength region about the $^{14}N^{15}N$ Q-branch obtained by photon counting.
Figure 10:
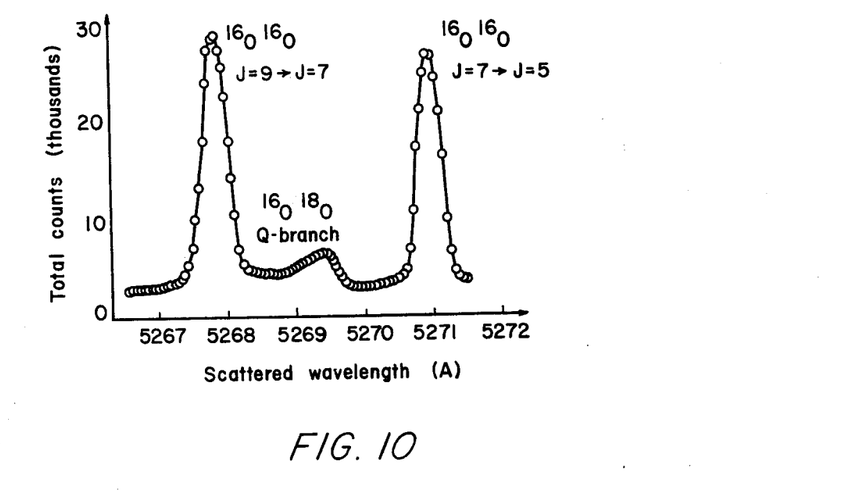
FIG. 10 is a high-resolution Raman spectrum of oxygen gas in the wavelength region about the $^{16}O^{18}O$ Q-branch obtained by photon counting.

Using the spectrometer described above, high-resolution Raman spectra of nitrogen gas in the region of the Q-branch of $^{14}N^{15}N$ and of oxygen gas in the region of the Q-branch of $^{16}O^{18}O$ were obtained. These species are shown in FIGS. 9 and 10, respectively. There is very little overlap of lines in these two special cases, which means that photons scattered from $^{14}N^{15}N$ can be accurately counted in the presence of large amounts of $^{14}N^{14}N$ and photons from $^{16}O^{18}O$ can be accurately counted even in the presence of large amounts of $^{16}O^{16}O$.

In addition to obtaining spectra we used our spectrometer to obtain cross sections of $^{14}N^{15}N$ relative to $^{14}N^{14}N$ and of $^{16}O^{18}O$ relative to $^{16}O^{16}O$. This was accomplished in the following manner. A sample of the gas to be studied (oxygen or nitrogen) was sealed in a special scattering cell and placed in the laser beam. The slits of the double monochromator were adjusted to yield 4 cm$^{-1}$ resolution. This was sufficiently large so that the monochromator would pass most of the photons in the Q-branch of either isotopic species without passing any photons in the O- or S-branch lines of the other isotopic species. The spectrometer was then scanned through the Q-branch of the abundant isotopic species ($^{16}O^{16}O$ or $^{14}N^{14}N$) and then through the Q-branch of the low-abundance isotopic species ($^{16}O^{18}O$ or $^{14}N^{15}N$) to obtain the peak count rates. The numbers were corrected using data from the monitor to correspond to the same total incident photon fluence. The sample was then removed from the Raman spectrometer and analyzed with a conventional mass spectrometer to determine how much of each isotopic species was present. Since the scattered intensity is proportional to the product of the cross-section and the density, the ratio of the peak count rates of the isotopic species divided by the isotope ratio obtained by mass spectrometry yielded the ratio of the isotopic cross sections. Using the technique we obtained $\sigma(^{14}N^{15}N)/\sigma(^{14}N^{14}N) = 1.14 \pm 0.11$ and $\sigma(^{16}O^{18}O)/\sigma(^{16}O^{16}O) = 1.05 \pm 0.10$.

It is important to recognize that out measurement of the relative isotopic cross sections is equivalent to a calibration of our spectrometer for future isotope ratio measurements on samples of oxygen or nitrogen of unknown isotopic composition. Given such a sample we are able to measure its isotopic composition (to the accuracy of our cross section measurements) by simply scanning through the various isotopic Q-branches. That is, FIG. 8 also illustrates a specific embodiment of our invention. In fact, neglecting the monitor electronics, the control unit, the wavelength drive, and the printer, the spectrometer of FIG. 8 is identical to the photon source and one arm of the isotope measurment system of FIG. 2.

During the cross-section measurements, peak count rates of approximately 20 counts/sec were obtained in the Q-branches of both $^{14}N^{15}N$ and $^{16}O^{18}O$. The samples were composed of either atmospheric pressure, natural abundance nitrogen gas or atmosperic pressure, natural abundance oxygen gas and the laser power incident on the sample was approximately 1.2 watts. In the absence of dark noise (which can be reduced to a negliglible 3 counts/sec by cooling special photomultiplier tues to −70° C) and stray light (which can be essentially eliminated by using holographic gratings in the double monochromators) 10$^6$ counts are required on the low-abundance isotopic line to produce an isotope measurement to 0.1% accuracy ($=\sqrt{N}/N$). At our measured 20 counts/sec, $5 \times 10^4$ seconds would be required to make such a measurement in nitrogen or oxygen. However, this is for a photon beam power of 1.2 watts. Inside the cavity of a commercially-available high-power argon ion laser the photon beam power can exceed 1000 watts. At this power 17,000 counts/sec could be expected in the Q-branches of either $^{16}O^{18}O$ or $^{14}N^{15}N$. Thus, for this intracavity system, only 60 sec would be required to make a 0.1% isotope ratio measurement on either natural abundance oxygen or nitrogen. This is at least an order of magnitude less time than it would take a conventional mass spectrometer to make the same measurement. In addition, none of the isotope measurement techniques utilizing Raman scattering, which are discussed in this specification, consumes the sample. This demonstrates the practical utility of our invention.

While several embodiments of our invention have been shown and described, these are intended only to be illustrative, and various modifications may be made therein by those skilled in the art. We therefore intend that the scope of our invention be limited solely by the following claims.

We claim:

1. A method for measuring isotope ratios and isotopic abundances, comprising the steps of:
    a. directing a beam of quasi-monochromatic photons onto a sample to be analyzed, thereby causing each isotopic species in the sample to Raman-scatter photons at discrete frequencies characteristic of each of said species,
    b. utilizing detectors for measuring the intensity of said scattered photons for each isotopic species of interest,
    c. generating the fractional abundance, $f_j$, of an isotope $j$ of an element X by inserting the respective measured photon intensities in the equation:

$$f_j = \frac{\sum_k n_{kj} I_{mk} \epsilon_k^{-1}}{\sum_k n_{kx} I_{mk} \epsilon_k^{-1}}$$

and determining the value of $f_j$, and
    d. generating the ratio, $R_{ij}$, of the abundance of isotope $i$ to isotope $j$ of element X by inserting the respective measured photon intensities in the equation:

$$R_{ij} = \frac{\sum_k n_{ki} I_{mk} \epsilon_k^{-1}}{\sum_k n_{kj} I_{mk} \epsilon_k^{-1}}$$

and determining the value of $R_{ij}$,
    where $n_{ki}$ and $n_{kj}$ are the number of atoms of isotope $i$ and isotope $j$, respectively, per molecule of isotopic species $k$, where $n_{kx}$ is the total number of atoms of element X per molecule of isotopic species $k$, where $I_{mk}$ is the measured scattered photon intensity for isotopic species $k$, where $\epsilon_k$ is the effective efficiency of the detector for photons scattered from isotopic species $k$, and where the summations, $\Sigma$, are carried out over the total number of isotopic species of interest.

2. The method according to claim 1 wherein nuclear Raman scattering is utilized.

3. The method according to claim 1 wherein electronic Raman scattering is utilized.

4. The method according to claim 1 wherein vibrational Raman scattering is utilized.

5. The method according to claim 1 wherein rotational Raman scattering is utilized.

6. The method according to claim 1 wherein said beam of photons is a laser beam.

7. The method according to claim 1 wherein said beam of photons is produced through neutron-capture gamma decay.

8. The method according to claim 1 wherein said measurement is accomplished by photocurrent-measuring techniques.

9. An apparatus for measuring isotope ratios and isotope abundances, comprising the combination of:
    a. a beam of quasi-monochromatic photons produced from a source comprising a neutron-capture gamma-decay target placed in an intense neutron flux,
    b. means for directing said photon beam onto a sample to be analyzed, thereby causing said isotopic species in the sample to Raman-scatter photons at the frequencies characteristic of each of said species, and
    c. means for measuring the intensity of said scattered photons for each isotopic species of interest, said measured photon intensity being representative of the desired isotope ratio and isotope abundance.

10. The apparatus according to claim 9 wherein said measuring means is an energy-sensitive gamma-ray detector and signal-processing electronic circuitry.

11. An apparatus for measuring isotope ratios and isotopic abundances, comprising the combination of:
    a. a laser,
    b. a sample cell adapted to contain a sample whose isotope ratios and isotopic abundances are to be measured,
    c. means for holding said sample cell in the laser beam,
    d. an optical system for directing and focusing said laser beam into said sample cell, thereby causing each isotopic species in the sample to Raman-scatter photons at discrete frequencies characteristic of each of said species,
    e. two monochromators,
    f. two optical systems for collecting and focusing the Raman-scattered photons onto the entrance slits of said monochromators,
    g. two photomultiplier tubes, one for each monochromator,
    h. a power supply to energize the photomultiplier tubes, and
    i. means for electronically processing the output signals from said photomultiplier tubes to obtain data representative of the desired isotope ratios and isotopic abundances.

12. The apparatus according to claim 11 wherein the sample cell is placed inside the laser cavity.

13. An apparatus for measuring isotope ratios and isotopic abundances, comprising the combination of:
    a. a laser,
    b. a sample cell adapted to contain a sample whose isotope ratios and isotopic abundances are to be measured,
    c. means for holding said sample cell in the laser beam,
    d. an optical system for directing and focusing said laser beam into said sample cell, thereby causing each isotopic species in the sample to Raman-scatter photons at discrete frequencies characteristic of each said of said species,
    e. two filters each designed to pass a different isotopic Raman-scattered frequency,
    f. two optical systems for collecting the Raman-scattered photons and directing them into said filters,
    g. two photomultiplier tubes,
    h. two optical systems for focusing the photons passed through said filters onto said photomultiplier tubes, i. a power supply to energize the photomultiplier tubes, and
j. means for electronically processing the output signals from said photomultipliers to obtain data representative of the desired isotope ratios and isotopic abundances.

14. The apparatus according to claim 13 wherein the sample cell is placed inside the laser cavity.

15. An apparatus for measuring isotope ratios and isotopic abundances, comprising the combination of:
   a. a laser,
   b. a sample cell adapted to contain a sample whose isotope ratios and isotopic abundances are to be measured,
   c. means for holding said sample cell in the laser beam,
   d. an optical system for directing and focusing said laser beam into said sample cell, thereby causing each isotopic species in the sample to Raman-scatter photons at discrete frequencies characteristic of each of said species,
   e. two filters each designed to pass a different isotopic Raman-scattered frequency,
   f. an optical system for collecting the Raman-scattered photons forming a beam of scattered photons,
   g. means of inserting said filters into said scattered-photon beam in an alternating manner,
   h. a photomultiplier tube,
   i. an optical system for focusing the photons passed through said alternating filters onto said photomultiplier tube,
   j. a power supply to energize the photomultiplier tube, and
   k. means for electronically processing the alternating output signals from said photomultiplier tube to obtain data representative of the desired isotope ratios and isotopic abundances.

16. The apparatus according to claim 15 wherein the sample cell is placed inside the laser cavity.

17. A method for measuring isotope ratios and isotope abundances, comprising the steps of:
   a. directing a beam of quasi-monochromatic photons onto a sample to be analyzed, thereby causing each isotopic species in the sample to Raman-scatter photons at discrete frequencies characteristic of each of said species;
   b. utilizing detectors for measuring the number of said Raman-scattered photons for each isotopic species of interest;
   c. generating the fractional abundance, $f_j$, of an isotope $j$ of an element X by inserting the measured values of the number, $N_{mk}$, of Raman-scattered photons into the equation:

$$f_j = \frac{\sum_k n_{kj} I_{mk} \epsilon_k^{-1}}{\sum_k n_{kx} I_{mk} \epsilon_k^{-1}}$$

and determining the value of $f_j$; and,
d. generating the ratio, $R_{ij}$, of the abundance of isotope $i$ to isotope $j$ of element X by inserting the respective measured values of the number, $N_{mk}$, of Raman-scattered photons into the equation:

$$R_{ij} = \frac{\sum_k n_{ki} I_{mk} \epsilon_k^{-1}}{\sum_k n_{kj} I_{mk} \epsilon_k^{-1}}$$

and determining the value of $R_{ij}$;
where $n_{ki}$ and $n_{kj}$ are the number of atoms of isotope $i$ and isotope $j$, respectively, per molecule of isotopic species $k$; where $\epsilon_k$ is the effective efficiency of the detector for photons scattered from isotopic species $k$; and where the summations, $\Sigma$, are carried out over the total number of isotopic species of interest.

18. The method according to claim 17 wherein nuclear Raman-scattering is utilized.

19. The method according to claim 17 wherein electronic Raman-scattering is utilized.

20. The method according to claim 17 wherein vibrational Raman-scattering is utilized.

21. The method according to claim 17 wherein rotational Raman-scattering is utilized.

22. The method according to claim 17 wherein said beam of photons is a laser beam.

23. The method according to claim 17 wherein said beam of photons is produced through neutron-capture gamma decay.

24. The method according to claim 17 wherein said measurement is accomplished by photon-counting techniques.

25. An apparatus for measuring isotope ratios and isotope abundances, comprising the combination of:
   a. a beam of quasi-monochromatic photons produced from a source comprising a neutron-capture gamma-decay target placed in an intense neutron flux,
   b. means for directing said photon beam onto a sample to be analyzed, thereby causing each isotopic species in the sample to Raman-scatter photons at the frequencies characteristic of each of said species, and
   c. means for measuring the number of said scattered photons for each isotopic species of interest, said measured photon numbers being representative of the desired isotope ratio and isotope abundance.

* * * * *

UNITED STATES PATENT OFFICE
CERTIFICATE OF CORRECTION

Patent No. 4,068,953          Dated January 17, 1978

Inventor(s) ROBERT C. HARNEY et.al.

It is certified that error appears in the above-identified patent and that said Letters Patent are hereby corrected as shown below:

Column 1, line 23, "th" should read --the--.
Column 1, line 33, "desireable" should read --desirable--.
Column 1, line 64, "ech" should read --each--.
Column 3, line 38, "techniques should read --technique--.
Column 7, line 40, "detector" should read --detected--.
Column 7, line 41, "31 70°C" should read -- -70°C --
Column 7, line 63, "Species" should read --spectra--
Column 8, line 32, "out" should read --our--.
Column 8, line 50, "atmosperic" should read --atmospheric--.
Column 8, line 54, "tues" should read --tubes--.
Column 10, line 60, "said" (first occurance) should be deleted.

Signed and Sealed this

Ninth Day of May 1978

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,068,953                     Dated January 17, 1978

Inventor(s) Robert C. Harney, et.al.

It is certified that error appears in the above-identified patent and that said Letters Patent are hereby corrected as shown below:

Column 1, line 10 insert "The Government has rights in this invention pursuant to Contract No. W-7405-ENG-48 awarded by the U.S. Energy Research and Development Administration."

Signed and Sealed this

Twenty-first Day of July 1981

[SEAL]

Attest:

Attesting Officer

GERALD J. MOSSINGHOFF

Commissioner of Patents and Trademarks